United States Patent
Balabanovic et al.

(10) Patent No.: US 6,782,393 B1
(45) Date of Patent: Aug. 24, 2004

(54) METHOD AND SYSTEM FOR ELECTRONIC MESSAGE COMPOSITION WITH RELEVANT DOCUMENTS

(75) Inventors: Marko Balabanovic, London (GB); Gregory J. Wolff, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 271 days.

(21) Appl. No.: 09/587,591

(22) Filed: May 31, 2000

(51) Int. Cl.[7] .............................................. G06F 17/30
(52) U.S. Cl. ..................... 707/104.1; 345/700; 707/10
(58) Field of Search .............................. 707/3, 5, 530, 707/515, 501.1, 512, 531, 104.1, 1, 10; 345/708, 700

(56) References Cited

U.S. PATENT DOCUMENTS

| | | | | |
|---|---|---|---|---|
| 4,553,206 A | * | 11/1985 | Smutek et al. | 707/101 |
| 5,634,051 A | * | 5/1997 | Thomson | 707/5 |
| 5,717,914 A | * | 2/1998 | Husick et al. | 345/440 |
| 5,724,567 A | * | 3/1998 | Rose et al. | 345/716 |
| 5,742,816 A | * | 4/1998 | Barr et al. | 707/104.1 |
| 5,754,939 A | * | 5/1998 | Herz et al. | 455/3.04 |
| 5,781,901 A | * | 7/1998 | Kuzma | 707/10 |
| 5,966,126 A | * | 10/1999 | Szabo | 345/762 |
| 6,078,916 A | * | 6/2000 | Culliss | 707/5 |
| 6,182,095 B1 | * | 1/2001 | Leymaster et al. | 706/46 |
| 6,236,768 B1 | * | 5/2001 | Rhodes et al. | 382/306 |
| 6,237,011 B1 | * | 5/2001 | Ferguson et al. | 707/500 |
| 6,272,485 B1 | * | 8/2001 | Sragner | 707/1 |
| 6,356,922 B1 | * | 3/2002 | Schilit et al. | 707/3 |
| 6,377,965 B1 | * | 4/2002 | Hachamovitch et al. | 707/530 |

OTHER PUBLICATIONS

Augustine Chidi Ikeji, Farhad Fotouhi, "An Adaptive Real-Time Web Search Engine", 1989, ACM, WIDM 99, p. 12–16.*

M. G. Brown, J. T. Foote, G. J .F. Jones, K. Sparck Jones, S. J. Young, "Open–Vocabulary Speech Indexing for Voice and Video Mail Retrieval", 1996, ACM, ACM Multimedia 96, p. 307–316.*

Michael Fuller, Eric Mackie, Ron Sacks–Davis, Ross Wilkinson, "Structured Answers for a Large Structured Document Collection", 1993, ACM, ACM–SIGIR'93, p. 204–213.*

Rhodes et al. "Remembrance Agent A continuously running automated information retrieval system". 1996. The Proceedings of The First Int. Conf. on The Practical Application of Intelligent Agents and Multi Agent Technology (PAAM '96). pp. 487–495.*

* cited by examiner

Primary Examiner—Greta Robinson
(74) Attorney, Agent, or Firm—Blakely, Sokoloff, Taylor & Zafman LLP

(57) ABSTRACT

In one embodiment, a message is composed on a display, and a first set of documents including a user's current context pertaining to the message is identified. Further, a second set of documents related to the first set of documents is automatically provided, allowing for inclusion of any document in the second set of documents into the message being composed.

21 Claims, 3 Drawing Sheets

METHOD AND SYSTEM FOR ELECTRONIC MESSAGE COMPOSITION WITH RELEVANT DOCUMENTS

FIELD OF THE INVENTION

The present invention relates to the field of computer systems. In particular, the present invention relates to electronic message composition with relevant documents.

BACKGROUND OF THE INVENTION

Communications technology today allows individuals to send messages to one another from virtually any location in the world at virtually any time of day. The variety of communication modes (e.g., telephone, network, computer, etc.) and communication media (e.g., electronic mail, voice mail, facsimiles, etc.) available today allows individuals to choose among the many modes and media depending on the circumstances.

In general, message senders today may select from a variety of communication media while message receivers are limited to the option selected by the message sender. If the sender uses the telephone to leave a voice mail message, the message receiver is required use a telephone to retrieve the voice mail message. If the sender uses a computer to send an e-mail message, the message receiver typically uses a computer to retrieve the e-mail message.

Interfaces have been developed that create multimedia messages. E-mail editors such as Outlook® manufactured by Microsoft® Corporation of Redmond, Wash., allow a user to include "attachments" within mail messages. The attachment may be any electronic file, such as a spreadsheet, letter, or graphic. HTML editors, such as Frontpage® manufactured by Microsoft® Corporation of Redmond, Wash., allow a user to create documents with embedded images and audio clips. These documents may be e-mailed or viewed from a Web site.

One problem with such systems is that they do not retrieve the documents that are to be referenced in a message. Users often retrieve documents manually by attaching files to an e-mail. Thus, the user must know exactly where the relevant files are that are to be retrieved and have the message composing software attach them to the e-mail message. With immense disk storage space and increasing storage locations, finding relevant files on the user's system is time consuming and difficult. Furthermore, even if a user knows the physical location of a desired file, the number of steps required to retrieve the file can be very time consuming.

SUMMARY OF THE INVENTION

A method and system for composing electronic messages with relevant documents is disclosed. In one embodiment, one or more documents of different types are collected. Then, context documents from the one or more documents are selected. Finally, related documents are provided that are relevant to the message and are associated with the context documents.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
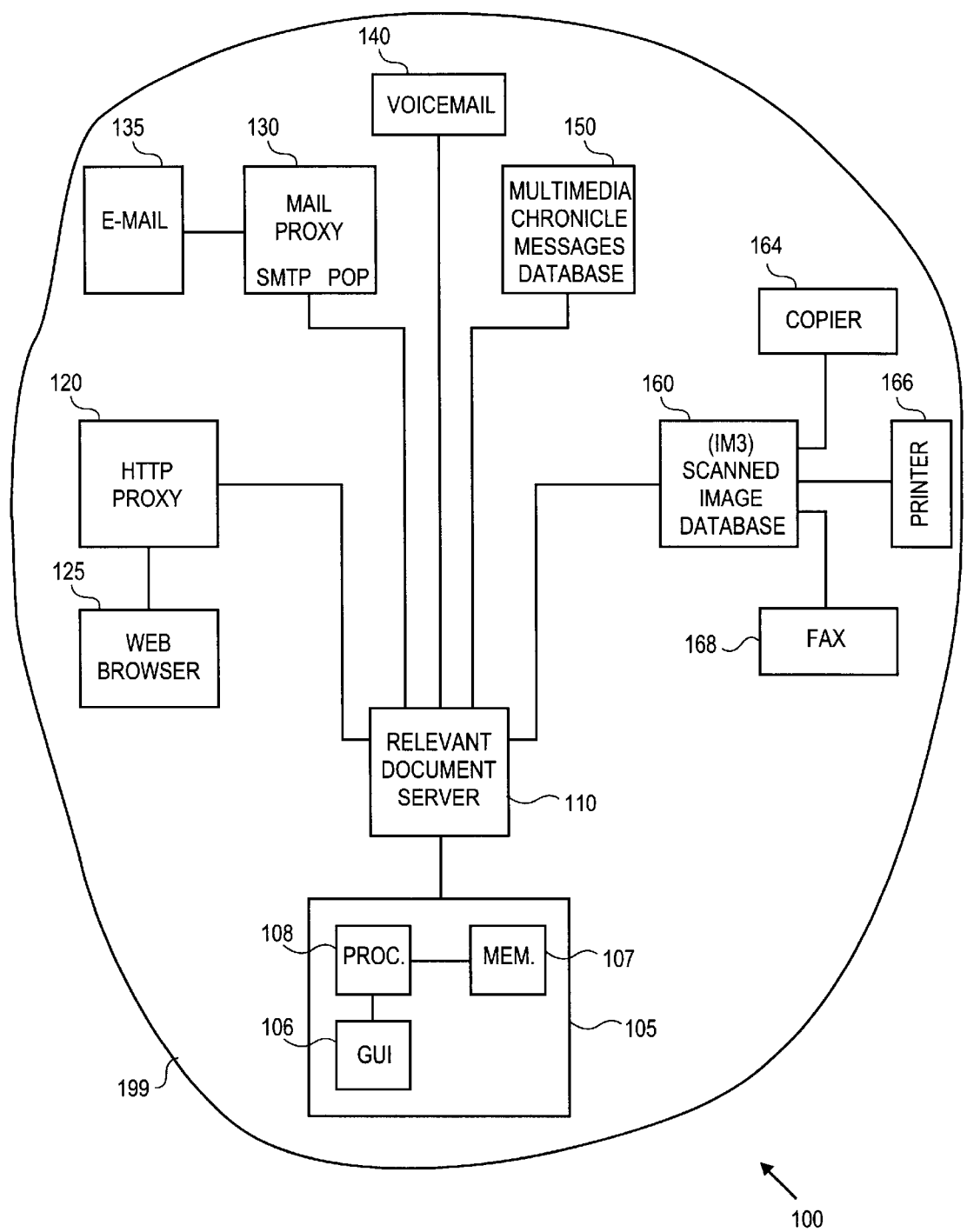
FIG. 1 is a high-level block diagram of one embodiment of a system for composing electronic messages.

A method and system for composing electronic messages with relevant documents provided automatically as described. In one embodiment, one or more documents of different types are collected. Then, context documents from the one or more documents are selected. Finally, related documents are provided that are relevant to the message and are associated with the context documents.

As described hereafter, the present system automatically provides documents that are relevant to a message being composed. The term "documents" as used throughout the specification includes all media objects including word processing documents, faxes, and such. Numerous documents exist on a typical user's computer system. When composing a message, the user selects one or more of these numerous documents to include with the message. The present system determines which documents are relevant to the message being composed based upon the documents selected by the user initially.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to documentary data. However, the same techniques can easily be applied to other types of data such as voice and video.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 shows one embodiment of a high-level block diagram of a system for composing electronic messages. Referring to FIG. 1, message composition system 100 includes a client 105. In one embodiment, the client 105 is an IBM® compatible personal computer (PC), an Apple® personal computer, or a SUN® SPARC Workstation. The software implementing the functionality described herein can be stored on any storage medium accessible by user client 105. Client 105 includes a processor 108 coupled with memory 107 and graphical user interface (GUI) 106. GUI 106 could be a monitor, television screen or other display device.

Coupled with the Client 105 is the relevant document server 110 that provides different categories of documents to the Client 105. In one embodiment, the relevant document server 110 is a full document storage system capable of storing and delivering the different categories of document. In another embodiment, the relevant document server 110 is a limited-time cache connected to external document databases.

In one embodiment, the relevant document server 110 is coupled with the HTTP Proxy 120 that captures recently browsed Web pages from Web browser 125. Mail proxy 130 is connected to server 110 and captures sent and received electronic mail messages from E-Mail server 135. Captured voicemail is provided to the relevant document server 10 from voicemail server 140 via relevant document server 110. Multimedia chronicle messages database 150 provides relevant document server 110 with various multimedia type documents. Also coupled with the relevant document server 110 is a scanned image database 160 which captures documents from sources such as, for example, copier 164, printer 166, and facsimile machine 168. In another embodiment, the HTTP proxy 120, mail proxy 130, voicemail server 140, multimedia database 150, and scanned image database 160 are integrated within relevant document server 110. In yet another embodiment, some or all of the sources such as, copier 164, printer 166, and facsimile machine 168 could be coupled to client 105 directly. Thus, the relevant document server 110 stores and captures documents from various sources. In one embodiment, an existing document management system (such as, for example, an infinite memory machine or finite management application (e.g. eCabinet) system) is integrated with the present system, the relevant documents server 110. The relevant document server 110 queries the existing management system to find relevant documents.

In one embodiment, all elements of the system 100 are interconnected via network 199. Network 199 may be any wide area network (WAN), or local area network (LAN). In general, the network architecture described herein may be implemented as a standard telephone connection provided through an Internet service provider to enable data communication on the Internet over a conventional telephone network. This use of the Internet as a distribution network is well known to those of ordinary skill in the art. In an alternate embodiment through the use of cable modem technology, communication may be performed over a conventional cable network in lieu of, or in addition to, communication over the telephone network. The cable network is typically much faster (e.g., provides a much greater bandwidth) than the standard telephone network; however, cable modems are typically more expensive than standard POTS (plain old telephone system) modems. In another alternate embodiment, through Integrated Services Digital Network (ISDN) technology, the network 110 is accessed using an ISDN modem. Again, the ISDN network is typically faster than the POTS network; however, access to an ISDN network is generally more expensive. Cable modems and ISDN implementations are alternative communications media to a POTS implementation.

Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation.

Figure 2:
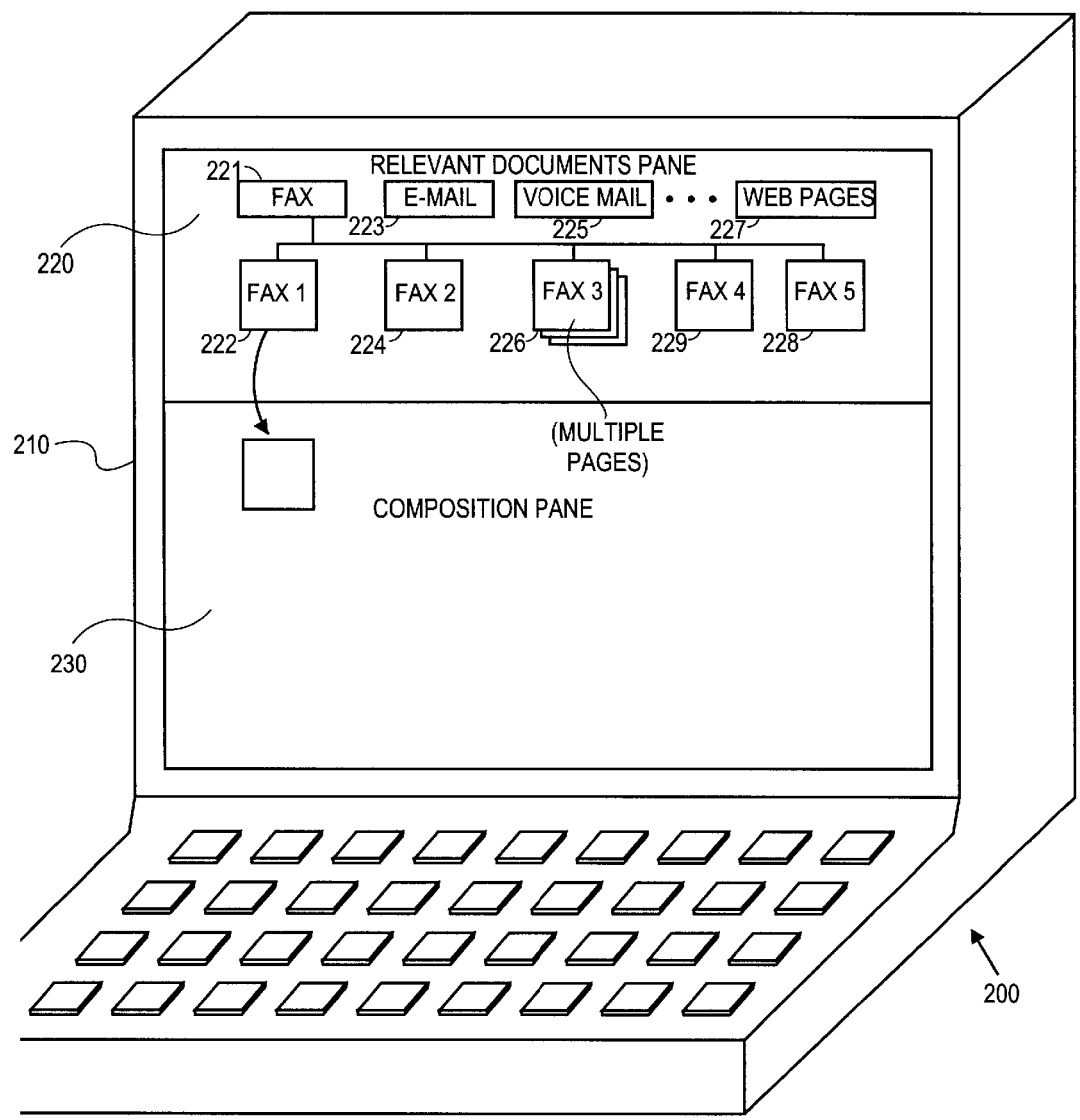
FIG. 2 is an exemplary graphical user interface displayed by the system of FIG. 1.

FIG. 2 shows an exemplary graphical user interface for client 200. Client 200 has a graphical user interface (GUI) 210. Although shown as rectangular windows within GUI 210, composition pane 230 and relevant documents pane 220 could be any size or any shape that is visible or partially visible in GUI 210. Relevant documents pane 220 includes icons 222, 224, 226, 228, and 229 in the form of thumbnails. Relevant documents pane 220 also includes tabs 221, 223, 225, and 227. In one embodiment, the relevant document's pane 220 could be scrollable, thereby, allowing users to view the different types of documents available. In another embodiment, a switch could be provided to allow selection among the different categories of documents.

Relevant documents are documents related in some manner (e.g., subject matter, time of last modification, time of download, etc.) to the message being composed. For example, in one embodiment, relevant documents pane 220 has a facsimile tab 221, e-mail tab 223, voicemail tab 225, and web page tab 227. Each tab may represent all the relevant documents of a particular type. When a user selects or clicks a tab 221, 223, 225, or 227, the relevant documents of the tab type appear in the relevant documents pane 220. For example, by clicking on fax tab 221 relevant faxes appear as icons 222, 224, 226, 228, and 229. Relevant faxes may be ordered by relevancy, date, or type from left to right. Relevant documents may be displayed in a way that represents the relative relevance scores of the documents. For example, documents with close relevancy scores will have smaller gaps between their thumbnail displays. Furthermore, faxes having multiple pages may be represented as icon 226. The icons 222, 224, 226, 228, and 229 may be thumbnail images of the documents they represent. Selecting an icon, by either clicking or dragging it, moves the icon to the composition pane 230.

In the composition pane 230, a user composes a new message such as a multimedia chronicle. The message may be saved or sent to another user. In another embodiment, the composition pane 230 could be a regular text-based electronic mail composition window, and the selected icons would be added as email attachments. Messages may include or reference any number of relevant documents. However, the set of documents visible in the relevant documents pane may change as the user composes the message.

In another embodiment, the system shows a user a fixed number of relevant documents from each category of documents. For example, when fax icon 222 is selected, the ten most relevant faxes only appear. In yet another embodiment, the relevant documents pane 220 show all documents created or modified in a period of time. For example, when fax icon 222 is selected, all faxes sent within the last ten days are shown.

Figure 3:
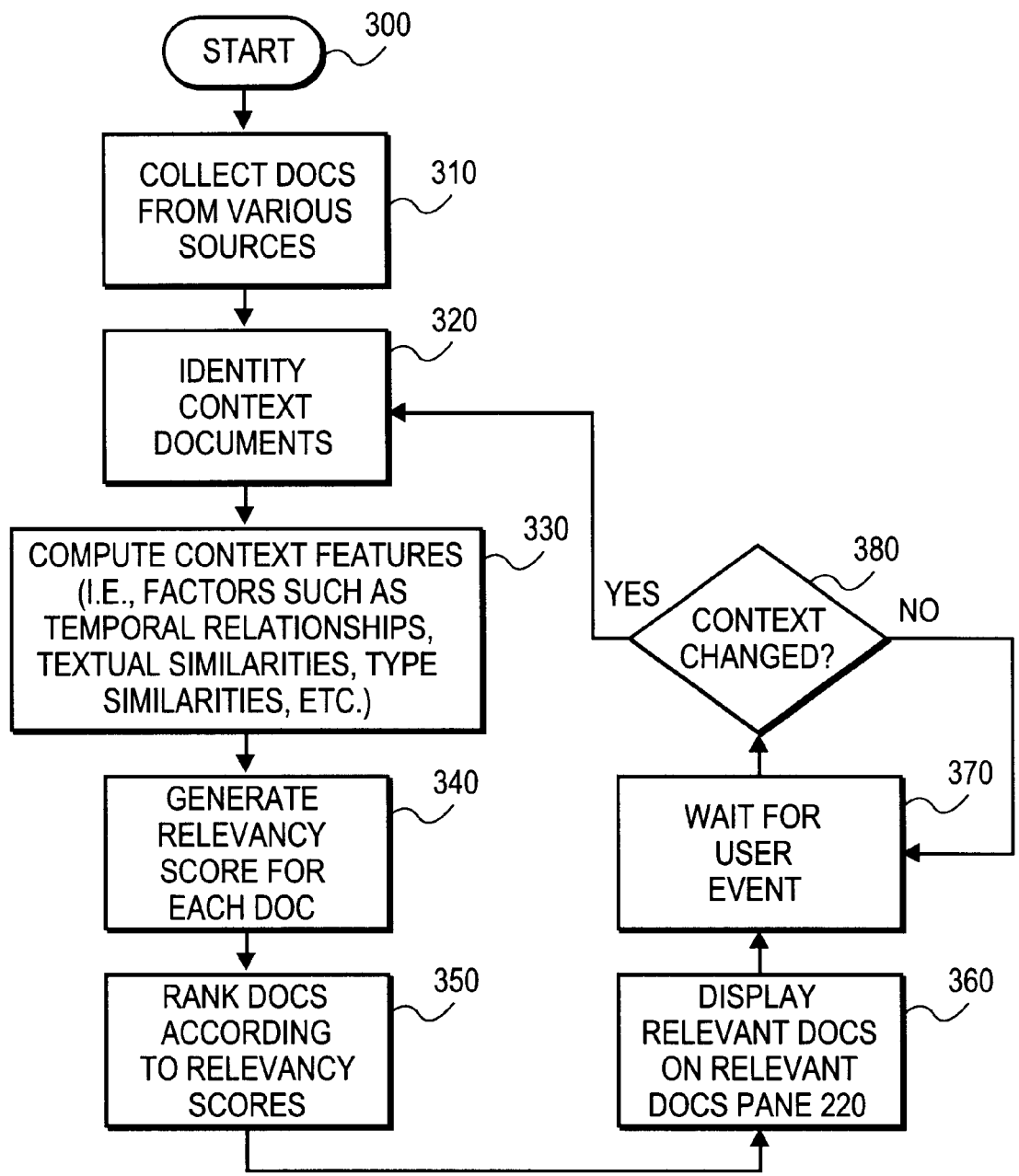
FIG. 3 is a flow diagram of one embodiment of a process for providing relevant documents.

FIG. 3 shows a flow diagram of one embodiment of a process for providing relevant documents. The logic described by the flow diagram of FIG. 3 may be implemented by processor 108 of client 105. In other embodiments, the logic described in FIG. 3 may be implemented within the relevant document server 110. Referring to FIG. 3, the process begins in block 300. In processing block 310, documents of different types are collected from various sources. For example, documents may be collected from facsimiles, copiers, scanners, electronic messages, voice mails and Internet Web pages. A subset of these documents is then denoted as the user's current context documents in processing block 320. Context documents include any or all of the following types of documents: the current message being composed in composition pane 230; a message that the current message is replying to or continuing; any documents referenced by the current message; documents referenced by the message that the current message is replying to or continuing; any documents recently accessed; and documents selected by the user. The set of context documents may be divided further into subsets for purposes of context features and relevancy computations of processing blocks 330 and 340.

In one embodiment, the context documents are divided into two subsets, a "message" subset "M" that includes documents selected by the user to be included in the current message and a "context" subset "C" that includes all other context documents, such as, recently viewed documents, documents included in previous messages, and documents linked in subset M. Typically, subset M will be given greater weighting in the relevancy computations than the subset C.

In processing block 330, the context features (factors) are computed. A feature may be any information associated with a message or document, or the feature may be calculated or extracted from a message, document or set of documents. Examples of features may include the temporal relationship between the document being analyzed and the selected context documents. For example, a document received on the same day as selected context documents may be scored as more relevant than the same document received one month before any other context document. Other features include the textual similarity between the document being analyzed and the selected context documents; whether the analyzed document is hyperlinked to one document of the selected context documents; whether the analyzed document is provided by searching the World Wide Web for the selected context documents; whether the analyzed document is referenced by one document of the selected context documents; or whether the analyzed document is a prior message in a current conversation thread.

For each feature, a similarity metric may be defined that calculates the similarity between two documents based on that feature. In one embodiment, the similarity between document A and document B for the feature "Creation Time" may be defined as the inverse logarithm of the absolute difference (in hours) between the creation of document A and document B. Thus, $$S_{creation}(A, B) = \frac{1}{\log(|T_A - T_B|)}$$

where $T_A$ is the time of creation of document A and $T_B$ is the time of creation of document B.

In another embodiment, for hypertext links, the similarity may be defined as the number of shared links between documents A and B. Thus, $$S_{links}(A, B) = \sum_{i=1}^{L_A} \sum_{j=1}^{L_B} l_{ij},$$

where $I_{ij}=1$, if and only if the referent of link i in document A is equal to the referent of link j in document B, otherwise $I_{ij}=0$.

Any number of features and associated similarity metrics may be used to compute the relevancy score in processing block 340. In one embodiment, for a given document X, the relevancy for X with respect to a subset of documents Y, can be calculated as a weighted sum of the similarities between X and each document in Y. Thus, $$R_{yx} = \sum_{y \in Y} \sum_{f=1}^{F} w_f S_f(X, Y),$$

where f is the set of features and $w_f$ is the weight associated with the feature f, and $S_f$ is the similarity metric of feature f. The relevancy score for document X with respect to a context may be calculated as the weighted sum of the relevance of X to each subset of documents in the context. In one embodiment, the context consists of a subset of documents, M, included in the message and a subset of documents C, containing the other context documents specified above. In this case, the relevancy score for X is:

$$\text{Rel}(X) = \alpha R_{MX} + \beta R_{CX},$$

where $R_{MX}$ is the relevance of document X to message M, $R_{CX}$ is the relevance of document X to the current context C which includes all documents referenced in M, plus documents recently accessed by the user, α and β sum to 1 and are relative weights for message and context relevance and indicate the relative importance of each subset.

In one embodiment, the features f, similarities S, feature weights $w_f$ and α and β are predetermined values. In another embodiment, the feature weights $W_f$, are adjusted in block 330. In yet another embodiment, feature weights $w_f$ can be adjusted directly through a user input, such as, by selecting tabs 221, 223, 225, and 227. If the user removes or adds tabs, the feature represented by the tab may be removed or added to the relevancy calculation. In one embodiment, the feature weights $w_f$ are adjusted automatically based on the statistics of the content documents. Similarity metrics that give high values for pairs of documents in the current context are given high weights that may be calculated as follows. If $C_f$ is the pair wise similarity for feature f of all documents in subset C, then $$C_f = \sum_{A \in C} \sum_{B \in C} S_f(A, B).$$

$w_f$ may be calculated as $$w_f = \frac{C_f}{\sum_{f \in F} C_f}$$

representing the relative contribution of feature f to the similarity of all documents in subset C. Subset C may be all documents in the context or just those included in the message. The weighting of the factors may also be adjusted by considering the documents included in a set of previous messages.

The weighting of the factors may be based upon an analysis of existing messages. A separate formula may be applied to calculate each relevancy score. For example, a cosine term frequency for certain text may be done or the logarithm of the difference in the co-occurrence of author names may be used. In another embodiment, the relevancy score for a feature of relative dates or times may be the number of days between date x and date y. In another embodiment, the relevancy scores are predicted based upon statistical information of the selected context documents.

In processing block 350, the documents are ranked according to their relevancy scores. Relevant documents are then displayed in the relevant documents pane 220 in processing block 360. The system then waits for a user event to occur in processing block 370. For example, a user event may occur when the user drags a document into the composition pane 230. In decision block 380, the system determines if the current context has changed due to the occurrence of an user event. If the context changed, then flow is passed back to processing block 320 where the set of context documents is updated. If the context has not changed, the system continues to wait for a user event in processing block 370. Thus, the process seamlessly provides the user documents relevant to the user's present composition.

A computer networking system and method for composing electronic messages with automatically provident relevant documents is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A computer-implemented method comprising:
    composing, on a screen, an electronic message to be sent to a recipient via a communications network;
    identifying a first set of one or more documents that include a current user context pertaining to the electronic message; and
    automatically providing a second set of documents related to the first set while composing the electronic message, wherein each document in the second set is selectable to be sent to the recipient as an attachment to the electronic message.

2. The method of claim 1, wherein identifying a first set of one or more documents further comprises:
    selecting, from a plurality of source documents, documents associated with most recent user actions, the user actions including at least one of a document access, a document receipt, a document viewing, a document creation, and a document modification.

3. The method of claim 1, wherein automatically providing a second set of documents further comprises:
    calculating relevancy scores for a plurality of source documents using one or more factors associated with the first set of documents; and
    ranking the plurality of source documents according to the relevancy scores.

4. The method of claim 3, wherein the one or more factors are selected from a group consisting of temporal relationships between the plurality of source documents and the first set of documents, textual similarities between the plurality of source documents and the first set of documents, similarities between types of the plurality of source documents and types of the first set of documents, existence of hyperlinks between the plurality of source documents and the first set of documents, whether the plurality of source documents resulted from a Web search for the first set of documents, whether the plurality of source documents are referenced within the first set of documents, and whether any of the plurality of source documents represent a previous message in a current conversation thread.

5. The method of claim 3, wherein automatically providing a second set of documents further comprises using statistics of existing messages to calculate relevancy scores for the plurality of source documents.

6. The method of claim 1, wherein automatically providing a second set of documents further comprises providing a fixed number of documents related to the first set of documents for each different document type.

7. A system comprising:
    a graphical user interface (GUI);
    a composition pane within the GUI to compose an electronic message to be sent to a recipient via a communications network;
    a documents pane within the GUI to display, in response to a current context associated with the electronic message, one or more low resolution representations of documents relevant to the electronic message,
    wherein one or more of the documents relevant to the electronic message are to be sent to the recipient as an attachment to the electronic message if the one or more low resolution representations are selected within the documents pane; and
    a relevant documents server coupled with the GUI, wherein the relevant documents server provides the documents relevant to the electronic message.

8. The system of claim 7, wherein the documents pane is further to include graphical representations of one or more document types, the one or more document types being selected from the group consisting of a photocopy, an email message, a voice mail message, a Web page, and a multimedia document.

9. The system of claim 7, wherein the relevant document server collects a plurality of source documents of a plurality of document types, searches the plurality of source documents for the documents relevant to the electronic message, and provides the documents relevant to the electronic message and corresponding document types to the GUI.

10. A system for selecting documents relevant to a message being composed, comprising:

means for composing, on a screen, a an electronic message to be sent to a recipient via a communications network;

means for identifying a first set of one or more documents that include a current user context pertaining to the electronic message; and means for automatically providing a second set of documents related to the first set while composing the electronic message, wherein each document in the second set is selectable to be sent to the recipient as an attachment to the electronic message.

11. The system of claim 10, wherein means for identifying a first set of one or more documents further comprises:

means for selecting, from a plurality of source documents, documents associated with most recent user actions, the user actions including at least one of a document access, a document receipt, a document viewing, a document creation, and a document modification.

12. The system of claim 10, wherein means for automatically providing a second set of documents further comprises:

means for calculating relevancy scores for a plurality of source documents using one or more factors associated with the first set of documents; and means for ranking the plurality of source documents according to the relevancy scores.

13. The system of claim 12, wherein the one or more factors are selected from a group consisting of temporal relationships between the plurality of source documents and the first set of documents, textual similarities between the plurality of source documents and the first set of documents, similarities between types of the plurality of source documents and types of the first set of documents, existence of hyperlinks between the plurality of source documents and the first set of documents, whether the plurality of source documents resulted from a Web search for the first set of documents, whether the plurality of source documents are referenced within the first set of documents, and whether any of the plurality of source documents represent a previous message in a current conversation thread.

14. The system of claim 12, wherein means for automatically providing a second set of documents further comprises means for using statistics of existing messages to calculate relevancy scores for the plurality of source documents.

15. The system of claim 10, wherein means for automatically providing a second set of documents further comprises means for providing a fixed number of documents related to the first set of documents for each different document type.

16. A computer-readable medium having stored thereon a plurality of instructions, said plurality of instructions when executed by a processor, cause said processor to perform a method comprising:

composing, on a screen, an electronic message to be sent to a recipient via a communications network;

identifying a first set of one or more documents that include a current user context pertaining to the electronic message; and automatically providing a second set of documents related to the first set while composing the electronic message, wherein each document in the second set is selectable to be sent to the recipient as an attachment to the electronic message.

17. The computer-readable medium of claim 16 wherein automatically providing a second set of documents comprises:

calculating relevancy scores for a plurality of source documents using one or more factors associated with the first set of documents; and ranking the plurality of source documents according to the relevancy scores.

18. The computer-readable medium of claim 16 wherein identifying a first set of one or more documents further comprises:

selecting, from a plurality of source documents, documents associated with most recent user actions, the user actions including at least one of a document access, a document receipt, a document viewing, a document creation, and a document modification.

19. The computer-readable medium of claim 17 wherein the one or more factors are selected from a group consisting of temporal relationships between the plurality of source documents and the first set of documents, textual similarities between the plurality of source documents and the first set of documents, similarities between types of the plurality of source documents and types of the first set of documents, existence of hyperlinks between the plurality of source documents and the first set of documents, whether the plurality of source documents resulted from a Web search for the first set of documents, whether the plurality of source documents are referenced within the first set of documents, and whether any of the plurality of source documents represent a previous message in a current conversation thread.

20. The computer-readable medium of claim 16 wherein automatically providing a second set of documents comprises using statistics of existing messages to predict relevancy scores for the plurality of source documents.

21. The computer-readable medium of claim 16 wherein automatically providing a second set of documents comprises providing a fixed number of documents related to the first set of documents for each different document type.

* * * * *